United States Patent
Shimano et al.

(10) Patent No.: US 10,488,561 B2
(45) Date of Patent: Nov. 26, 2019

(54) IMAGING DEVICE

(71) Applicant: Hitachi, Ltd., Chiyoda-ku, Tokyo (JP)

(72) Inventors: Takeshi Shimano, Tokyo (JP); Yusuke Nakamura, Tokyo (JP); Kazuyuki Tajima, Tokyo (JP); Mayu Sao, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 25 days.

(21) Appl. No.: 15/961,574

(22) Filed: Apr. 24, 2018

(65) Prior Publication Data
US 2018/0329118 A1    Nov. 15, 2018

(30) Foreign Application Priority Data

May 12, 2017 (JP) .................................. 2017-95429

(51) Int. Cl.
| | |
|---|---|
| *H04N 5/357* | (2011.01) |
| *H04N 5/40* | (2006.01) |
| *G02B 3/00* | (2006.01) |
| *H04N 5/225* | (2006.01) |
| *H04N 5/217* | (2011.01) |

(52) U.S. Cl.
CPC .......... *G02B 3/0043* (2013.01); *H04N 5/217* (2013.01); *H04N 5/2254* (2013.01); *H04N 5/3572* (2013.01); *H04N 5/40* (2013.01)

(58) Field of Classification Search
CPC .... G02B 3/0043; H04N 5/3572; H04N 5/217; H04N 5/2254; H04N 5/40
See application file for complete search history.

(56) References Cited

U.S. PATENT DOCUMENTS

| | | | | |
|---|---|---|---|---|
| 2009/0250594 A1* | 10/2009 | Tanaka | ................... | G02B 5/201 250/208.1 |
| 2012/0300301 A1* | 11/2012 | Ando | ................... | G02B 5/1814 359/565 |
| 2015/0219808 A1* | 8/2015 | Gill | ....................... | H04N 5/2254 348/335 |

FOREIGN PATENT DOCUMENTS

WO    WO 2016/203573 A1    12/2016

* cited by examiner

*Primary Examiner* — Mekonnen D Dagnew
(74) *Attorney, Agent, or Firm* — Crowell & Moring LLP (57) ABSTRACT

An imaging device includes: an image sensor that outputs, as an image signal, light received at a light-receiving surface; a phase modulation element provided in close to the light-receiving surface, which has a grating pattern composed of multiple zones arranged in a concentric form to modulate the phase of light passing through the grating pattern toward the surface; and an image processing unit that executes image processing for the image signal output from the sensor. The spacing between the phase modulation element and the image sensor is set so that the duty ratio of the full width at half maximum for a bright section to the width for one period of a projection image of the concentric grating pattern is 0.5 or less in the case of light incidence from a point light source disposed at a distance of a subject in the axial direction of a concentric circle of the grating pattern.

6 Claims, 8 Drawing Sheets

| ZONE NUMBER | ZONE-TO-RADIUS RATIO | REMARKS |
|---|---|---|
| 1 | 1 | |
| 2 | 1.41421356 | |
| 3 | 1.73205081 | |
| 4 | 2 | |
| 5 | 2.23606798 | |
| 6 | 2.44948974 | DELETION |
| 7 | 2.64575131 | |
| 8 | 2.82842712 | DELETION |
| 9 | 3 | |
| 10 | 3.16227766 | DELETION |
| 11 | 3.31662479 | |
| 12 | 3.46410162 | DELETION |
| 13 | 3.60555128 | |
| 14 | 3.74165739 | DELETION |
| 15 | 3.87298335 | |

IMAGING DEVICE

CLAIM OF PRIORITY

This application claims the priority based on the Japanese Patent Application No. 2017-95429 filed on May 12, 2017. The entire contents of which are incorporated herein by reference for all purpose.

BACKGROUND

Technical Field

The present invention relates to an imaging device, and more particularly, to an effective technique for the reduction in device size and in device thickness.

Related Art

Cameras mounted in terminals such as a smartphone and in-vehicle cameras increasingly required for 360° sensing require the reduction in thickness. In this regard, WO 2016/203573 discloses an imaging device where a concentric grating pattern is disposed immediately in front of an image sensor without the use of any lens, on a projection image of the grating pattern with light from a subject, another grating image is superimposed, thereby providing moire fringes, and from the moire image, a shot image of the subject is obtained in accordance with image processing.

In addition, WO 2016/203573 discloses the formation of the grating pattern from a cylindrical lens for the prevention of light shielding, in order to remedy the light amount loss caused by the use of a grating pattern with contrast, formed by an approach such as printing.

However, WO 2016/203573 is intended to collect light to such an extent that the projection image of the grating pattern provides a sinusoidal light intensity distribution, and there is thus a problem therewith in that the degree of modulation for the projection image of the gratins pattern is decreased due to overlaps between projection images from a large number of point light sources, thereby decreasing the S/N ratio of the reproduced image.

In addition, when an attempt is made to increase the effective focal length in order to enlarge and shot the produced image, there is a need to increase the distance between the grating pattern and the image sensor. In this regard, when an attempt is made to obtain moire fringes which are approximately twice as adequately fine as the pixel pitch of the image sensor, there is a need to increase also the focal length of the cylindrical lens. However, when the focal length of the cylindrical lens is increased with respect to the zone width of the cylindrical lens, there is a problem in that the influence of diffraction with the zone width becomes greater than the light collecting action of the lens, thereby losing the light collecting action.

SUMMARY

The present invention has been achieved in view of the problems mentioned above, and an object of the invention is to improve the image quality of a shot image from an imaging device that shots an image of a subject with the use of a grating pattern.

The present application encompasses more than one means for solving at least part of the problem mentioned above, and an example of the means will be given as follows.

An aspect of the present invention is an imaging device including: an image sensor that outputs, as an image signal, light received at a light-receiving surface; a phase modulation element provided in close to the light-receiving surface, which has a grating pattern composed of multiple zones arranged in a concentric form to modulate the phase of light passing through the grating pattern toward the light-receiving surface; and an image processing unit that executes image processing for the image signal output from the image sensor, where the spacing between the phase modulation element and the image sensor is set so that the duty ratio of the full width at half maximum for a bright section to the width for one period of a projection image of the concentric grating pattern is 0.5 or less in the case of light incidence from a point light source disposed at a distance of a subject in the axial direction of a concentric circle of the grating pattern.

The present invention can improve the image quality of a shot image from an imaging device that shots an image of a subject with the use of a grating pattern.

Objects, configurations, and advantageous effects other than the foregoing will be evident from the following description of the following embodiments.

DETAILED DESCRIPTION

In the following embodiments, explanations will be given which are divided into multiple sections or embodiments, if necessary, for the sake of convenience. However, unless expressly stated otherwise, the sections or embodiments are not to be considered independent of one another, but one section or embodiment has a relation partially or entirely with the other, such as modification examples, details, and supplemental explanations.

In addition, in the following embodiments, in the case of referring to the numbers (including numbers, numerical values, amounts, ranges, and the like) of elements, the numbers are not to be considered limited to any specific number, unless expressly stated otherwise, and unless obviously limited to the specific numbers in principle, but may be the specific numbers or more, or less.

Furthermore, in the following embodiments, obviously, the constituent elements (also including elemental steps) are not necessarily to be considered indispensable, unless expressly stated otherwise, and unless considered obviously indispensable in principle.

Likewise, in the following embodiments, in the case of referring to the shapes, positional relationship, and the like of the constituent elements, the shapes and the like are considered including equivalents substantially approximate or similar to the shapes and the like, unless expressly stated otherwise, and unless obviously excluded in principle. The same applies to the numerical values and ranges mentioned above.

In addition, throughout all of the drawings for the explanation of embodiments, the same members are denoted by the same reference numerals in principle, and repeated descriptions thereof will be omitted. Respective embodiments of the present invention will be described below with reference to the drawings.

First Embodiment

Figure 1:
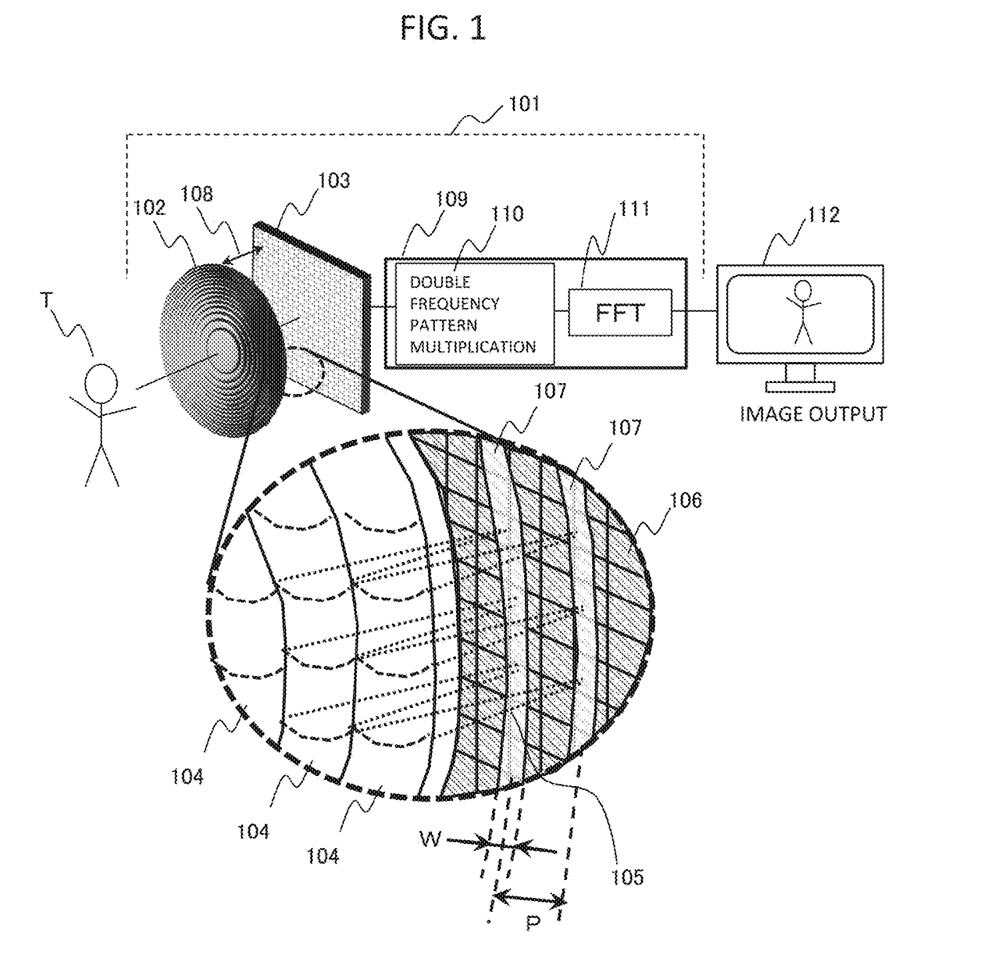
FIG. 1 is a diagram illustrating a configuration example of an imaging device according to a first embodiment.

FIG. 1 is a diagram illustrating a configuration example of an imaging device 101 according to the first embodiment.

The imaging device 101 is intended to acquire images of external objects without using any imaging lens for imaging as equipped in a normal camera. The imaging device 101 includes a phase modulation element 102, an image sensor 103, and an image processing circuit 109 (corresponding to an "image processing unit" according to the present invention). In the imaging device 101, light from a subject T is received by the image sensor 103 through the phase modulation element 102, the image signals output from the image sensor 103 are subjected to image processing by the image processing circuit 109, thereby providing a shot image of the subject T, and the image is output to an output device such as a display 112. The imaging device 101 may include an output device such as the display 112.

The phase modulation element 102 is disposed in close to the light-receiving surface of the image sensor 103. The phase modulation element 102 has a concentric grating pattern formed. Light from the subject T, which passes through the grating pattern, has an optical phase modulated by the grating pattern, and appears as a concentric projection image on the light-receiving surface of the image sensor 103.

The image sensor 103, which has a plurality of light-receiving elements arranged in a planar form, converts the optical image (projection image) to image signals as electrical signals, and outputs the signals to the image processing circuit 109. The image sensor 103 can be composed of, for example, an image sensor that uses an element such as a CCD (Charge Coupled Device) or a CMOS (Complementary Metal Oxide Semiconductor).

The image processing circuit 109 multiplies the output image from the image sensor 103 by a concentric grating pattern, thereby generating a moire fringe image. In addition, the image processing circuit 109 applies a Fourier transform operation to the generated moire fringe image, and obtains the absolute values thereof, thereby providing a shot image. The image processing circuit 109 outputs the generated shot image to the display 112.

The configuration and principle of the imaging device 101 described above will be described in detail.

The phase modulation element 102 is composed of multiple toric (zone-shaped) cylindrical lenses 104 arranged in a concentric form, so as to form a concentric grating pattern. The radial curvature of the toric cylindrical lens 104 is formed to be a curvature capable of collecting incident light 105 from a point light source at the predetermined distance of the subject T, so as to form a toric bright line 107 (bright section) on the light-receiving surface 106 of the image sensor 103 within the zone width. The radius position in the middle for the n-th toric cylindrical lens 104 from the center is given by $c\sqrt{(n+\phi i)}$ (c: constant, $\phi i$: phase, $\phi i=i/M$, $i=0, 1, \ldots, M-1$, M: phase division number). However, according to the present embodiment, $M=1$ and $\phi i=0$, because the present embodiment is an example without the detection of multiple phases for noise reduction. It is to be noted that the circular region in the center of the phase modulation element 102, which is surrounded by the innermost toric cylindrical lens 104, corresponding to $n=0$, is composed of, not any cylindrical lens, but a spherical lens. When light passes through the foregoing phase modulation element 102, a projection image of the grating pattern is formed where toric (zone-shaped) bright sections and dark sections appear alternately in a concentric form.

In this regard, the distance 108 between the phase modulation element 102 and the image sensor 103 is not necessarily required to coincide with the focal length of the toric cylindrical lens 104. The toric bright lines 107 can be excessively reduced in thickness more than requires in some cases. Therefore, according to the present embodiment, the distance 108 is adjusted so that the full width at half maximum w for the toric bright line 107 is 0.5 or less with respect to the zone width P in the vicinity of the relevant toric bright line 107, in the case of light incidence from a point light source disposed at the distance of the subject T in the axial direction of the concentric pattern.

The full width at half maximum w refers to a full width at half maximum in a light intensity distribution of the toric bright line 107 in the radial direction. The zone width P refers to the distance between the centers of a toric bright line 107 and the adjacent toric bright line 107 in the radial direction, which can be also referred to as the width for one period of the projection image of the concentric pattern. In addition, the distance 108 can be also referred to as a distance that is adjusted to focus the toric cylindrical lenses 104 with an accuracy to the extent that the duty ratio is satisfied. When the distance 108 is adjusted so that the foregoing duty ratio is set, the light intensity distribution of the projection image in the radial direction is made equivalent to including the component of a zone pattern at 1/integer of the actual pitch P.

For example, if the light-collection sectional intensity distribution of a zone locally has a periodic structure at the pitch P, which is expressed in terms of a projection image intensity I(x) from a point light source at a position represented in coordinate x in the radial direction with the center position of a bright line as an origin, the projection image intensity I(x) can be subjected to a Fourier series expansion as follows:

[Mathematical Formula 1]

$$I(x) = a_0 + \sum_{k=1}^{\infty} a_k \cos\frac{2\pi k}{P}x \quad (1)$$

In this regard, for the sake of simplification, if the light-collection sectional intensity distribution has a rectangular shape with the width w, the expansion coefficient can be obtained as follows:

[Mathematical Formula 2]

$$a_0 = \frac{1}{P}\int_0^P I(x)dx = \frac{Aw}{P} \quad (2)$$

$$a_k = \frac{2}{P}\int_0^P I(x)\cos\left(\frac{2\pi k}{P}x\right)dx = \frac{2A}{P}\int_{-\frac{w}{2}}^{\frac{w}{2}}\cos\left(\frac{2\pi k}{P}x\right)dx = \frac{2A}{\pi k}\sin\frac{\pi k w}{P}$$

In this regard, A represents a rectangular intensity value when the sectional intensity distribution has the width w. In this regard, if the integral of the intensity within the zone width has a value Aw=C (constant), the foregoing formulas can be expressed by the following formulas:

[Mathematical Formula 3]

$$a_0 = \frac{C}{P} \quad (3)$$

$$a_k = \frac{2C}{\pi k w}\sin\frac{\pi k w}{P} = \frac{2C}{P}\text{sinc}\frac{kw}{P}$$

Figure 2:
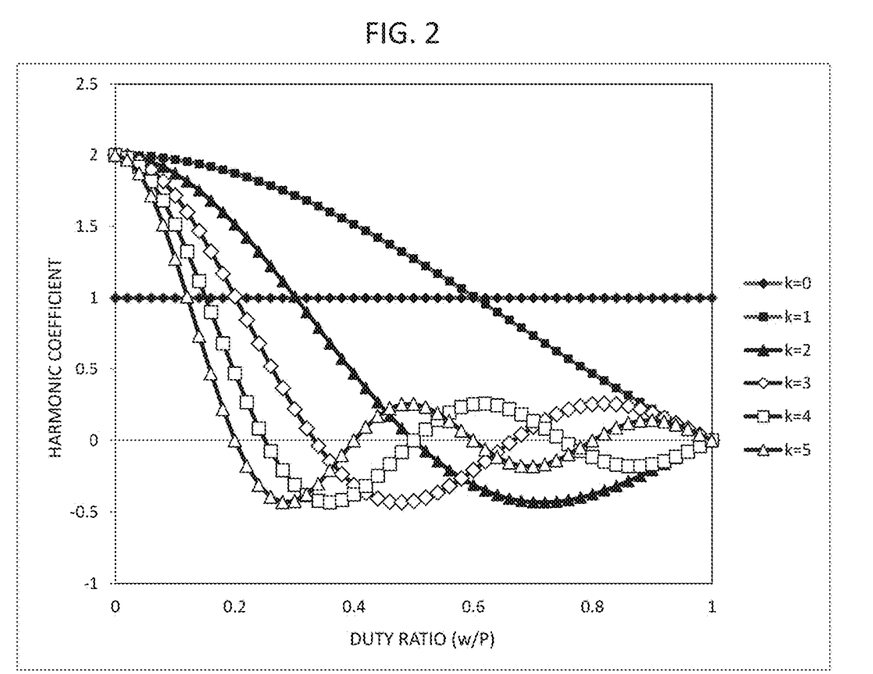
FIG. 2 is a diagram for explaining the relationship between a harmonic component and a duty ratio.

These formulas respectively express a direct-current component and a k-th harmonic component, and when the components are graphically shown with respect to the duty ratio with C/P=1, the components can be expressed as in FIG. 2.

FIG. 2 is a diagram for explaining the relationship between the harmonic component and the duty ratio. The vertical axis of the graph in FIG. 2 indicates a harmonic coefficient ($a_k/a_0$), whereas the horizontal axis thereof indicates a duty ratio (w/P). From FIG. 2, it is determined that as the duty ratio is decreased, the harmonic component of the Fourier expansion is increased to improve the degree of modulation for the modulation component of the projection image. In this regard, k=1 means a fundamental frequency component, which corresponds to a normal projection image component, and k=2 or more means actual harmonic components. The harmonic components are remarkably increased at the duty ratio of 0.5 or less, and it is thus determined that it is desirable to make an adjustment such that the duty ratio is 0.5 or less, in the case of using the harmonic components for the reproduction of the shot image.

While the foregoing explanation has been given on the assumption that the light-collection sectional intensity distribution has a local periodic structure, a case where the periodic structure is gradually changed (that is, the pitch P is gradually changed) will be described with reference to FIGS. 3A and 3B.

Figure 3A:
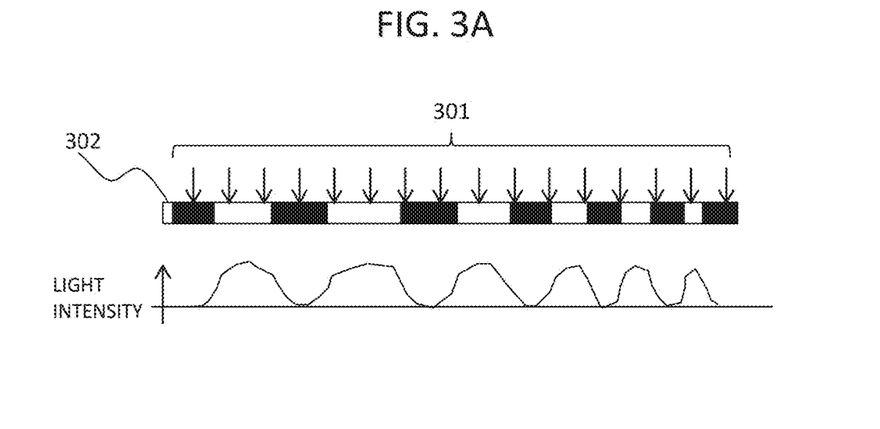
FIGS. 3A and 3B are pattern diagrams for explaining transmitted light intensity distributions on an image sensor.
Figure 3B:
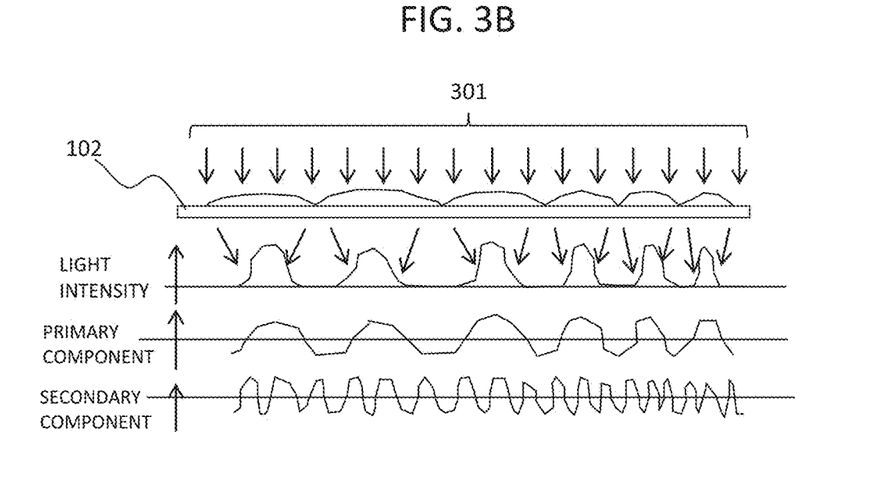

FIGS. 3A and 3B are pattern diagrams for explaining transmitted light intensity distributions on the image sensor 103. FIG. 3A shows a transmitted light intensity distribution that is obtained when incident light 301 is allowed to enter a shielding concentric pattern 302. FIG. 3B shows a transmitted light intensity distribution that is obtained when the light 301 is allowed to enter the phase modulation element 102, and further shows a primary component and a secondary component that are obtained when the light intensity distribution is subjected to a Fourier expansion. It is to be noted that the shielding concentric pattern 302 refers to a grating pattern with contrast, which is formed by, for example, printing, a sputtering method, or the like, as described in WO 2016/203573.

From FIGS. 3A and 3B, it is determined that even when the pitch P is uniformly changed, the Fourier coefficient obtained by the expansion in consideration of the periodic structure is maintained locally, and the periods of harmonics are changed in proportion to the period of the fundamental frequency component.

When the projection image of a grating pattern for the fundamental frequency component is multiplied by the image of a grating pattern for only the harmonic component in accordance with image processing, a moire fringe image can be formed between harmonic components. This moire fringe image formation will be described with reference to FIGS. 4 and 5.

Figure 4:
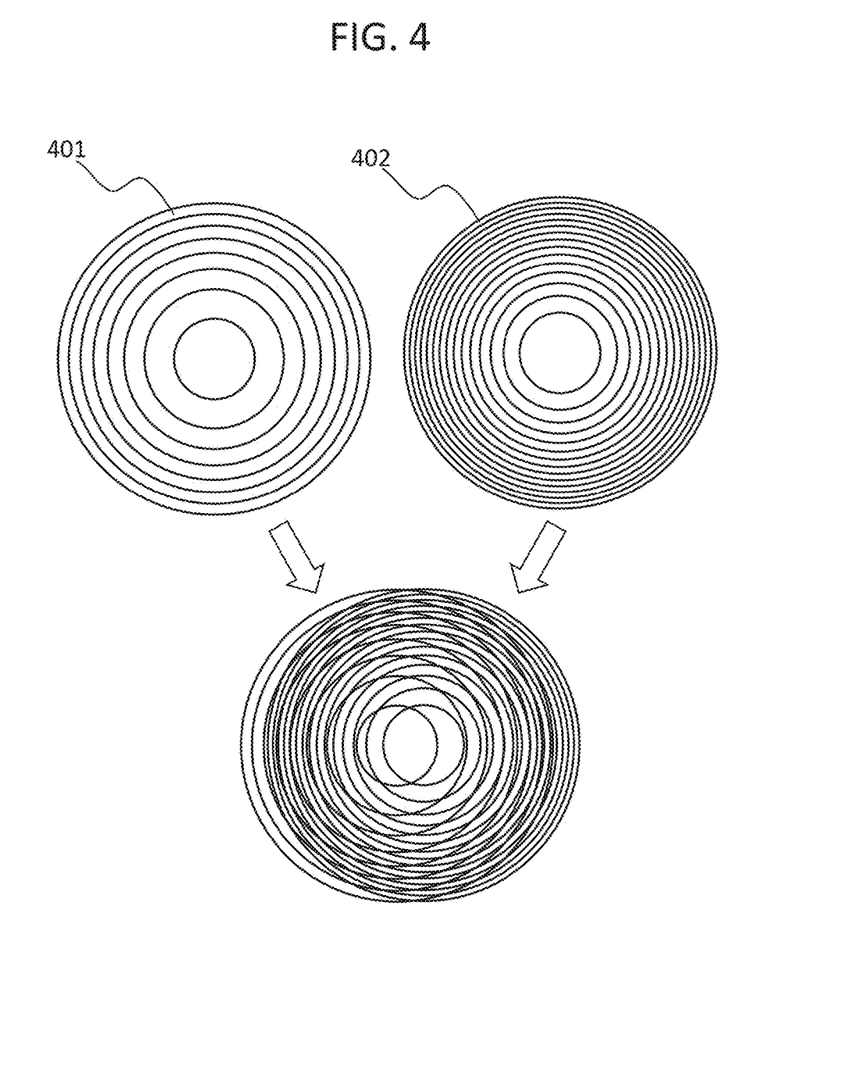
FIG. 4 is a diagram for explaining the moire fringe generation in the case of an overlap between different concentric patterns.
Figure 5:
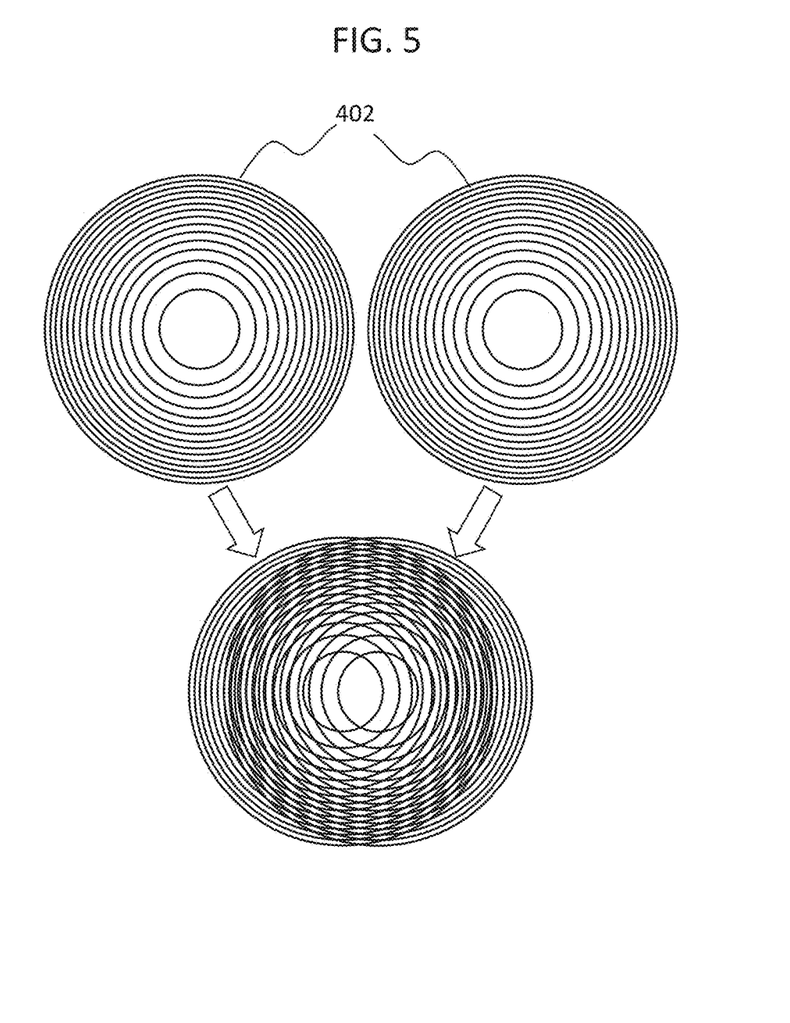
FIG. 5 is a diagram for explaining the moire fringe generation in the case of an overlap between equivalent concentric patterns.

FIG. 4 is a diagram for explaining the moire fringe generation in the case of an overlap between different concentric patterns. FIG. 4 schematically shows the case of an overlap between a concentric pattern 401 for a fundamental frequency component including a harmonic component at a duty ratio of 0.5 or less and a concentric pattern 402 for a second harmonic component at half the zone pitch of the concentric pattern 401. FIG. 5 is a diagram for explaining the moire fringe generation in the case of an overlap between equivalent concentric patterns. FIG. 5 schematically shows the case of an overlap between concentric patterns 402 for a second harmonic component.

When FIG. 4 is compared with FIG. 5, moire fringes at almost the same pitch are generated in FIGS. 4 and 5, although the moire fringes are faint in FIG. 4. From the foregoing, it is determined that effectively fine moire fringes of second harmonic can be generated also from the coarse concentric pattern for the fundamental frequency component.

As presented in WO 2016/203573, such moire fringes have pitches and orientations that reflect the angles of incident light beams, and moire fringes for multiple patterns from a large number of point light sources are synthesized, as the moire fringes differ in pitch and orientation from each other. When the moire fringes which differ in pitch and orientation are frequency-resolved by two-dimensional Fourier transform, the fringes are converted to bright spots with the pitches corresponding to the distances from the origin and the orientations corresponding to the directions from the origin. This bright spot serves as a bright spot representing light from a point light source, and thus, as a result, the same image can be obtained as imaged by a camera. Light from a large number of point light sources can be also simultaneously resolved, and then converted to respective bright spots, and an image of a subject can be thus eventually obtained.

It is to be noted that it is the spatial frequency component of the finest moire fringe that constitutes the outermost circumferential point image in the view of the reproduced image subjected to the two-dimensional Fourier transform, and the pitch of the finest moire fringe is fundamentally equal to the outermost circumferential pitch of the concentric pattern multiplied in the image processing. More specifically, the magnitude of the diameter or side of the reproduced image region is inversely proportional to the outermost circumferential pitch of the concentric pattern. On the other hand, in the case of discrete two-dimensional Fourier transform by fast Fourier transform (FFT), the Fourier transform image of the periodic pattern of the moire fringes generated over the entire region of the sensor image is converted to one pixel at a position corresponding to the spatial frequency, and when the magnitude of the diameter or side of the region where the periodic pattern is generated reaches ½ of the sensor width, the point image subjected to the Fourier transform is doubled in size. More specifically, the number of resolution points for substantial one side, obtained by dividing the magnitude of the diameter or side of the reproduced image region, by the size of a point image that can be resolved, is equal to the value obtained by dividing the magnitude of the diameter or side of the region where the periodic pattern is generated, by the outermost circumferential pitch of the concentric pattern multiplied.

Therefore, the size of the concentric pattern of the phase modulation element according to the present embodiment with the use of a harmonic component, which is represented with the outermost circumferential pitch as a unit, is reduced to 1/harmonic order used, which is smaller than the substantial number of resolution points for the diameter or side of the reproduced image. Conversely, in order to achieve the advantageous effect of the present embodiment, the outermost circumferential pitch of the phase modulation element may be made twice or more as large as the value obtained by dividing the size of the phase modulation element by the substantial number of resolution points for the diameter or side of the reproduced image region. Alternatively, the number of resolution points for the diameter or side, obtained by dividing the magnitude of the diameter or side of the shot image by the pixel pitch between two point images that can be resolved, may be made twice or more as large as the value obtained by dividing the size of the phase modulation element by the outermost circumferential pitch of the phase modulation element.

Returning to the explanation of FIG. 1, the image processing circuit 109 includes a double frequency pattern multiplication circuit 110 and a fast Fourier transform circuit 111. The double frequency pattern multiplication circuit 110 multiplies the output image of the image sensor 103 by a double frequency concentric pattern as mentioned above. Thus, a moire fringe image is obtained. The fast Fourier transform circuit 111 applies Fourier transform to the moire fringe image, and obtains the absolute values thereof, thereby reproducing the shot image.

The first embodiment of the present invention has been described above. According to the present embodiment, the pitch of the concentric grating pattern of the phase modulation element 102 disposed in close to the image sensor 103 can be made coarser than the pitch originally required. Thus, even when the spacing between the image sensor 103 and the phase modulation element 102 is increased to narrow the field of view and then enlarge the projection image, blurring of the projection image of the grating pattern due to diffraction can be reduced, thereby improving the image quality of the reproduced image. In addition, according to the present embodiment, the ratio of the modulation component to the direct-current component can be increased in the projection image of the grating pattern. Thus, even when projection images from a large number of point light sources constituting a subject have overlaps with each other, the degree of modulation for the projection image of the grating pattern can be kept from being decreased, thereby improving the contrast of the moire fringes, and thus improving the image quality of the reproduced image.

Second Embodiment

The imaging device 101 according to the first embodiment, in image processing, multiplies the second harmonic pattern of the phase modulation element 102, and applies Fourier transform directly to the obtained moire fringe image, thereby providing the reproduced image. However, in accordance with this configuration, the original concentric pattern component other than the moire fringes or the harmonic pattern component multiplied in the image processing may remain, and appear as image noise, thereby leading to problems. The second embodiment of the present invention will be described below mainly with reference to differences from the first embodiment.

Figure 6:
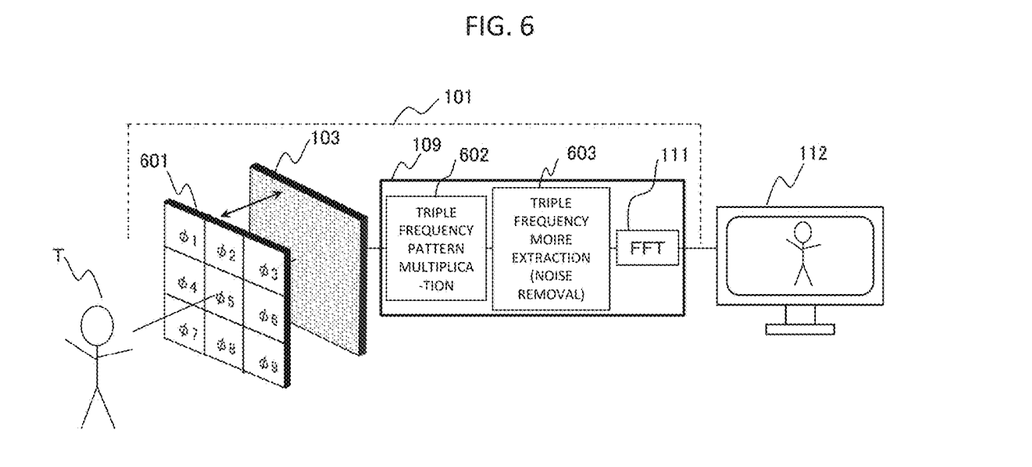
FIG. 6 is a diagram illustrating a configuration example of an imaging device according to a second embodiment.

FIG. 6 is a diagram illustrating a configuration example of an imaging device according to the second embodiment. The imaging device 101 according to the second embodiment includes a composite phase modulation element 601 in place of the phase modulation element 102 according to the first embodiment. In addition, an image processing circuit 109 according to the second embodiment includes a triple frequency pattern multiplication circuit 602 and a triple frequency moire extraction circuit 603 in place of the double frequency pattern multiplication circuit 110.

The composite phase modulation element 601 is disposed in close to the light-receiving surface of an image sensor 103. The composite phase modulation element 601 has multiple concentric grating patterns that differ in phase, formed in one plane. Specifically, the composite phase modulation element 601 has nine different concentric grating patterns arranged in a matrix of 3×3 at the light-receiving surface. Each of the grating patterns is formed to have multiple toric cylindrical lenses arranged in a concentric form in the same manner as in the first embodiment. In each grating pattern, the radius position in the middle for the n-th toric cylindrical lens from the center is given by $c\sqrt{(n+\phi i)}$ (c: constant, $\phi i$: phase, $\phi i=i/M$, $i=0, 1, \ldots, M-1$, M: phase division number, M=9), and $\phi 1$ to $\phi 9$ in the figure respectively correspond to the respective phase values.

The capability of extracting a moire fringe component by removing noise from moire fringes in a concentric pattern including a harmonic component will be theoretically explained below.

One concentric pattern including a large number of harmonic components, projected onto the image sensor by the p-th point light source (intensity $A_p$) constituting a subject T, is expressed as follows:

[Mathematical Formula 4]

$$I_p(x, y, \phi_F) = A_p \sum_{k=0}^{\infty} \alpha_k \cos k\beta\{(x-x_p)^2 + (y-y_p)^2 + \phi_F\} \quad (4)$$

x and y represent local positional coordinates on the image sensor, k represents a harmonic order, $\beta$ represents a constant that reflects the pitch of the concentric pattern, and $\phi_F$ represents the phase of the concentric pattern. The distribution obtained by multiplying, by the k'-th harmonic component, the sensor image further synthesized onto the image sensor by N point light sources is as follows with the use of the foregoing formula:

[Mathematical Formula 5]

$$I_p(x, y, \phi_F, \phi_B) = \left(\sum_{p=1}^{N} I_p(x, y, \phi_F)\right) \cos(k'\beta r^2 + \phi_B) \quad (5)$$

In this formula, $\phi_B$ represents the phase of an imaginary concentric pattern multiplied in image processing, and $r^2$ represents the squares of the radial coordinates, that is, $x^2+y^2$. For the sake of simplification, the ignorance of the squared terms for the positions of the point light sources results in the following:

[Mathematical Formula 6]

$$I_p(x, y, \phi_F, \phi_B) \cong \qquad (6)$$

$$\sum_{p=1}^{N} A_p \left\{ \sum_{k=0}^{\infty} \alpha_k \cos k(\beta(r^2 - 2xx_p - 2yy_p) + \phi_F) \right\} \cos(k'\beta r^2 + \phi_B) =$$

$$\frac{1}{2} \sum_{p=1}^{N} A_p$$

$$\left\{ \sum_{k \neq 2}^{\infty} \alpha_k \left\{ \begin{array}{l} \cos((k+k')\beta r^2 - 2k\beta(xx_p + yy_p) + k\phi_F + \phi_B) + \\ \cos((k-k')\beta r^2 - 2k\beta(xx_p + yy_p) + k\phi_F - \phi_B) \end{array} \right\} + \right.$$
$$\left. \alpha_{k'} \left\{ \begin{array}{l} \cos(2k'\beta r^2 - 2k'\beta(xx_p + yy_p) + k'\phi_F + \phi_B) + \\ \cos(-2k'\beta(xx_p + yy_p) + k'\phi_F - \phi_B) \end{array} \right\} \right\}$$

The last term represents a component which serves as a linear moire fringe without phase variations of $r^2$. The other terms all serve as noise, and the removal of the terms is required. For the sake of further simplification, both the moire component for signals and the noise are expressed all together as follows:

[Mathematical Formula 7]

$$I(x, y, \phi_F, \phi_B) = \qquad (7)$$

$$\frac{1}{2} \sum_{p=1}^{N} A_p \sum_{p=0}^{\infty} \alpha_k \{\cos(\theta_{1kp} + k\phi_F + \phi_B) + \cos(\theta_{2kp} + k\phi_F - \phi_B)\}$$

In the formula, $\theta_{1kp}$ and $\theta_{2kp}$ respectively represent a phase term of noise and a phase term including the moire component for signals. When this formula is multiplied by a complex exponential function including the phase of the phase modulation element and the phase of the imaginary concentric pattern, and subjected to a double integral with respect to each phase, only the phase term of the signal component can be extracted as follows:

[Mathematical Formula 8]

$$\int_0^{2\pi} \int_0^{2\pi} I(x, y, \phi_F, \phi_B) \exp\{i(k\phi_F + \phi_B)\} d\phi_F d\phi_B = \qquad (8)$$

$$\pi^2 \alpha_k \sum_{p=1}^{N} A_p \exp(i\theta_{2kp})$$

While the k-th term is extracted here in the sense that any term can be extracted, the extraction of the k'-th term as a moire component refers to the distribution of the synthesis of moire fringes from the N point light sources for signals. Conversely, the moire fringe component from the k-th harmonic for signals can be extracted as follows:

[Mathematical Formula 9]

$$\alpha_k \sum_{p=1}^{N} A_p \exp(-i2k\beta(xx_p + yy_p)) = \qquad (9)$$

$$\frac{1}{\pi^2} \int_0^{2\pi} \int_0^{2\pi} I(x, y, \phi_F, \phi_B) \exp\{i(k\phi_F + \phi_B)\} d\phi_F d\phi_B$$

Therefore, when this formula is subjected to Fourier transform, a distribution in which the p-th point light source produces a bright spot with a luminance in proportion to the intensity $A_p$ of the point light source at a position in proportion to the position ($x_p$, $y_p$) of the point light source can be obtained as follows:

[Mathematical Formula 10]

$$\alpha_k \sum_{p=1}^{N} A_p \delta\left(v_x - \frac{k\beta}{\pi} x_p, v_y - \frac{k\beta}{\pi} y_p\right) = \qquad (10)$$

$$\frac{1}{\pi^2} F\left[\int_0^{2\pi} \int_0^{2\pi} I(x, y, \phi_F, \phi_B) \exp\{i(k\phi_F + \phi_B)\} d\phi_F d\phi_B\right]$$

It is determined that the image of the subject can be reproduced. In the formula, F[ ] of the right-hand side represents the operation of the Fourier transform. In this regard, the brightness of the image is proportional to the expansion coefficient $\alpha_k$, it is determined that it is necessary to select a higher-order term with a coefficient as large as possible.

For the integral for the extraction of the moire fringe component in the right-hand side of the formula (10), it is not possible to select the phase values very finely in practice. Conversely, there is a need to keep the number of sampling points down to the extent that no aliasing is caused between different orders. However, in the case of using the third harmonic presented in the present embodiment, there is a need for the number of sampling points that can extract at least the third harmonic component, and the orthogonality of the trigonometric function is not true unless three points are sampled for one period of the third harmonic. At the same time, unless the fundamental frequency component is also sampled entirely for one period, it is not possible to remove the noise. One period of the fundamental frequency component includes therein three periods of third harmonic, and phase sampling is thus eventually required at nine points of 3×3. For this reason, in FIG. 6, for phase sampling at the nine points from $\phi 1$ to $\phi 9$, the composite phase modulation element 601 has concentric pattern apertures arranged in the light-receiving surface for respective phases.

It is to be noted that the phase sampling as mentioned above may be carried out in sequence in terms of time with the use of a variable modulation element such as a liquid crystal element.

The triple frequency pattern multiplication circuit 602 multiplies each phase area of the output image from the image sensor 103 by the corresponding triple frequency concentric pattern as mentioned above. The phase integral of the imaginary concentric pattern in the formula (10) requires only the third harmonic component for the imaginary concentric pattern multiplied, and the phase sampling is required just at three points at minimum. The triple frequency moire extraction circuit 603 performs the operation of the formula (9) for the moire fringe images obtained by the multiplication. The fast Fourier transform circuit 111 applies Fourier transform to the moire fringe images, and obtains the absolute values thereof, thereby reproducing the shot image.

The second embodiment of the present invention has been described above. According to the present embodiment, the remaining original concentric pattern component other than the moire fringes and harmonic pattern component multiplied in the image processing can be reduced, thereby improving the image quality of the shot image.

It is to be noted that a case of using the triple frequency has been presented in the present embodiment, the use of a double frequency or a quadruple or more frequency is also conceivable. In this case, the composite phase modulation element 601 has, for example, in the case of a double frequency, four different concentric grating patterns arranged in a matrix of 2×2 at the light-receiving surface, or in the case of a quadruple frequency, sixteen different concentric grating patterns arranged in a matrix of 4×4 at the light-receiving surface.

Third Embodiment

The capability of obtaining, with the use of a harmonic component, a shot image which is substantially equivalent to that in the case of using a phase modulation element with a fine pitch, even when the pitch of the concentric pattern of the phase modulation element is increased to reduce the influence of diffraction and then improve the contrast of the moire fringes, has been described in the first embodiment and the second embodiment. However, originally, as described in WO 2016/203573, there is a need to set the pitch of the concentric pattern to be coarser in the central part and finer toward the circumference, in order to obtain equally spaced straight moire fringes. For this reason, when the pitch of the concentric pattern is made coarser, the pitch of the central part which is originally large in pitch will be further increased, and there is concern that the contrast of moire fringes in the area to which the central part makes a contribution may be locally decreased. The third embodiment will be described below mainly with reference to differences from the first embodiment and the second embodiment.

For a phase modulation element according to the present embodiment, a first region (circular region) from the center to a first radius is composed of a concentric fundamental grating pattern that becomes finer in pitch in inverse proportion to the radius from the center. On the other hand, for the phase modulation element, a second region (toric region) from the first radius to an outer second radius is composed of a grating pattern that is obtained by removing a concentric circle (zone) from the fundamental grating pattern mentioned above for every m+1 concentric circles (m is any natural number). More specifically, the grating pattern of the phase modulation element serves as such a pattern that is kept at a fundamental frequency in the central part and removed for every m+1 circles from the radius position of an intermediate part between the innermost and the outermost. It is to be noted that the fundamental grating pattern refers to a periodic structure that is capable of forming equally spaced straight moire fringes. An example of such a concentric pattern will be described with reference to FIGS. 7A to 7D and FIG. 8.

Figure 7A:
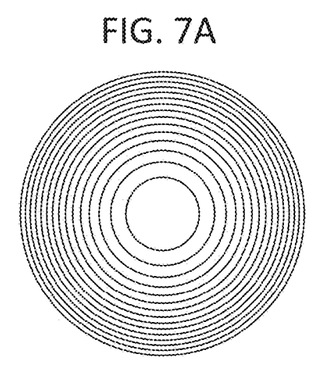
FIGS. 7A to 7D are diagrams for explaining an example of a concentric pattern according to a third embodiment.
Figure 7B:
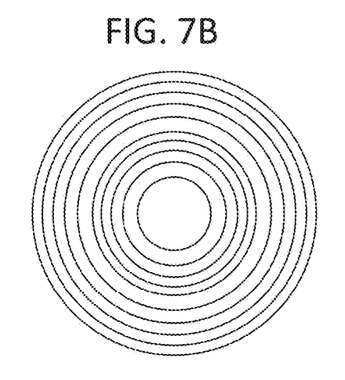
Figure 7C:
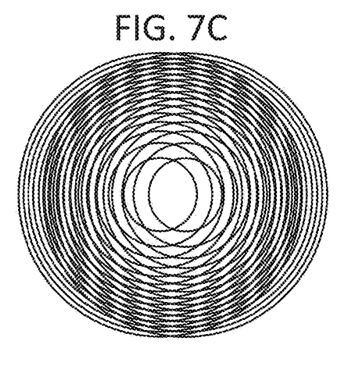
Figure 7D:
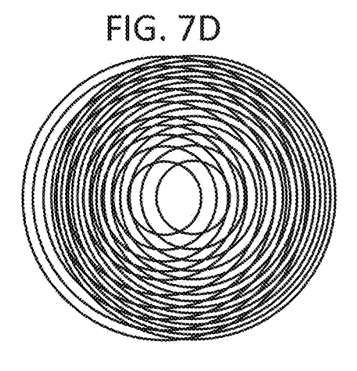
Figure 8:
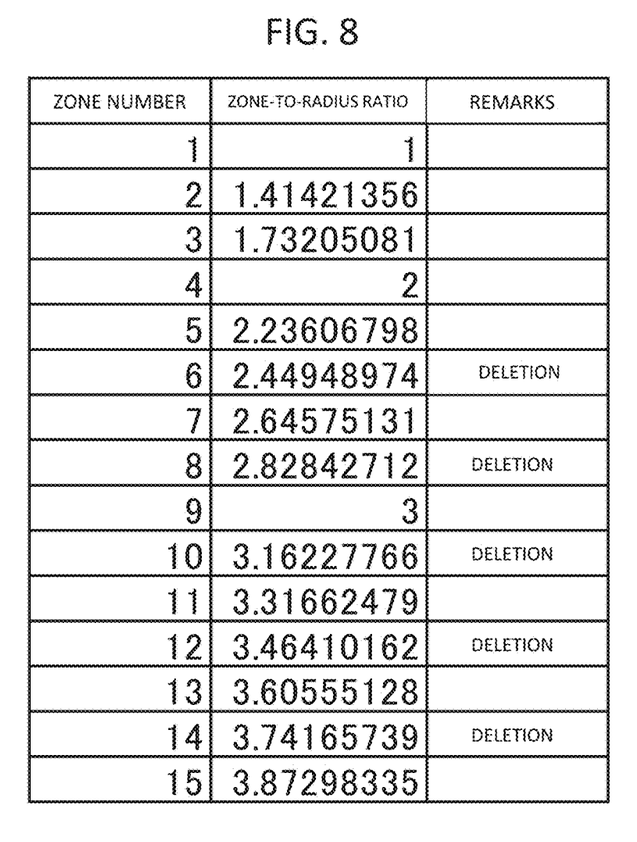
FIG. 8 is a diagram for explaining an example of the pitch for each concentric circle of a concentric pattern.

FIGS. 7A to 7D are diagrams for explaining an example of a concentric pattern according to the third embodiment. FIG. 8 is a diagram for explaining an example of the pitch for each concentric circle of the concentric pattern. FIG. 7A shows a concentric pattern arranged at a fundamental frequency from the center to the outer circumference, and FIG. 7B shows a concentric pattern in the case of deleting a zone for every two zones from the sixth zone from the center. FIG. 8 shows the zone number for each zone and the relative radius of the zone in the case of regarding the outside diameter of the central region as 1. In FIG. 8, the zones deleted in FIG. 7B are marked with the term "deletion". FIG. 7C shows concentric patterns of FIG. 7A relatively displaced to have an overlap with each other, and FIG. 7D shows respective concentric patterns of FIGS. 7A and 7B displaced in almost exactly the same manner to have an overlap with each other.

It is determined that in FIG. 7D, moire fringes are produced at almost the same pitch as in FIG. 7C, although the moire fringes are faint as compared with FIG. 7C. More specifically, this example indicates that it is also possible to adopt such a concentric pattern where β in the formula (4) described above is ½ outward from a radius, with the central part as a fundamental.

The third embodiment of the present invention has been described above. The use of the phase modulation element with a grating pattern as described above can make the pitch uniform over the entire concentric pattern, thereby reducing the influence of diffraction, and expecting further improvement in image quality.

It is to be noted that the present invention described above is not to be considered limited to the embodiments mentioned above, but considered to encompass various modification examples. For example, the embodiments mentioned above have been described in detail for clearly explaining the present invention, but are not necessarily to be considered limited to the inclusion of all of the configurations described.

In addition, it is possible to replace a part of a configuration according to an embodiment with a configuration according to another embodiment. In addition, it is also possible to add a configuration according to an embodiment to a configuration according to another embodiment. In addition, it is also possible to add/remove/substitute another configuration to/from/for a part of the configuration according to each embodiment.

In addition, the image processing circuit according to each of the embodiments mentioned above may be achieved, for example, with a computer including a processor such as a CPU (Central Processing Unit) that executes a predetermined software program, or with a combination of the image processing circuit with the computer, as long as a function equivalent to the circuit can be achieved. In addition, the phase modulation element according to each of the embodiments described above is, as long as a function equivalent to the multiple toric cylindrical lenses of the concentric pattern can be achieved, not limited to the cylindrical lenses, but may be achieved with another element such as a film or a substrate.

The present invention is not limited to any imaging device, but can be provided in various aspects such as an imaging method.

What is claimed is:
1. An imaging device comprising:
   an image sensor configured to output, as an image signal, light received at a light-receiving surface;
   a phase modulation element provided in close to the light-receiving surface, the phase modulation element comprising a grating pattern comprising multiple zones arranged in a concentric form, the phase modulation element configured to modulate a phase of light passing through the grating pattern toward the light-receiving surface; and an image processing unit configured to execute image processing for the image signal output from the image sensor, wherein spacing between the phase modulation element and the image sensor is set so that a duty ratio of a full width at half maximum for a bright section to a width for one period of a projection image of the concentric grating pattern is 0.5 or less in a case of light incidence from a point light source disposed at a distance of a subject in an axial direction of a concentric circle of the grating pattern.

2. The imaging device according to claim 1, wherein the number of resolution points for a diameter or a side, obtained by dividing a magnitude of a diameter or a side of a shot image shot by the imaging device, by a pixel pitch between two point images that can be resolved, is set be twice or more as large as a value obtained by dividing a size of the phase modulation element by an outermost circumferential pitch of the phase modulation element.

3. The imaging device according to claim 1, wherein the phase modulation element comprises multiple toric cylindrical lenses arranged in a concentric form, and the spacing between the phase modulation element and the image sensor is set to focus the toric cylindrical lenses to an extent that the duty ratio is satisfied.

4. The imaging device according to claim 1, wherein the phase modulation element comprises multiple toric cylindrical lenses arranged in a concentric form, and a radius from a concentric circle center of the grating pattern to a middle of an n-th toric cylindrical lens is given by $c\sqrt{(n+\phi_i)}$ (c: constant, $\phi_i$: phase, $\phi_i=i/M$, $i=0, 1, \ldots, M-1$, M: phase division number).

5. The imaging device according to claim 1, wherein the phase modulation element comprises multiple grating patterns that differ in phase, the grating patterns arranged in one plane.

6. The imaging device according to claim 1, wherein an inner first region of the grating pattern comprises a concentric first pattern that becomes finer in pitch in inverse proportion to a radius from a concentric circle center of the grating pattern, and an outer second region of the grating pattern comprises a second pattern that is obtained by removing a concentric circle from the first pattern for every m+1 concentric circles (m is any natural number).

* * * * *